United States Patent [19]

Hayashi

[11] Patent Number: 4,854,256
[45] Date of Patent: Aug. 8, 1989

[54] AQUATIC SHOW BOAT

[76] Inventor: Takeshi Hayashi, No. 85-3, Mitsuicho, Bezaiten, Muya-cho, Naruto-shi, Tokishima-ken, Japan, 772

[21] Appl. No.: 130,300

[22] Filed: Dec. 8, 1987

[30] Foreign Application Priority Data

Dec. 11, 1986 [JP] Japan ............................ 61-296203

[51] Int. Cl.⁴ .............................................. B63B 35/00
[52] U.S. Cl. ........................................ 114/61; 114/66; 114/270
[58] Field of Search .................... 114/61, 66, 270

[56] References Cited

U.S. PATENT DOCUMENTS

| | | | |
|---|---|---|---|
| 385,656 | 7/1888 | Belisle | 114/66 |
| 1,786,091 | 12/1930 | Stiles | 114/66 |
| 2,876,728 | 3/1959 | Luger | 114/61 |
| 3,240,186 | 3/1966 | Dobell | 114/66 |
| 4,494,472 | 1/1985 | Rougerie | 114/66 |
| 4,548,148 | 10/1985 | Bloomfield | 114/66 |
| 4,557,211 | 12/1985 | Schmidt | 114/61 |

FOREIGN PATENT DOCUMENTS 63-12235  1/1988  Japan .

*Primary Examiner*—Sherman D. Basinger
*Assistant Examiner*—Stephen P. Avila
*Attorney, Agent, or Firm*—Wenderoth, Lind & Ponack

[57] ABSTRACT

An aquatic show boat has a pair of separated, long narrow hulls joined in a parallel fashion (catamaran like) by a plurality of connecting pieces which together with both hulls enclose the perimeter of at least one activity area. Demonstrations, exhibits and recreation, etc. in an activity area can be viewed from observation decks provided on the hulls, or on the hulls and connecting pieces.

9 Claims, 9 Drawing Sheets

AQUATIC SHOW BOAT

BACKGROUND OF THE INVENTION

This invention relates to multipurpose, twin hull (catamaran like), aquatic show boats designed for carrying large numbers of passengers, and having at least one aquatic activity area. More particularly, the perimeter of the aquatic activity area is entirely enclosed and the activity area can be viewed from either above or below the water surface.

1. Description of the Prior Art

Many types of sightseeing, recreation and exhibition boats for viewing tidal whirlpools and various aquatic shows, etc. are common public knowledge. However, all former sightseeing vessels allow viewing from only one side of the vessel at a time. For this reason, either a dangerous situation is created when many passengers crowd to one side and cause the vessel to list, or else all passengers cannot simultaneously fully enjoy the best view.

Figure 21:
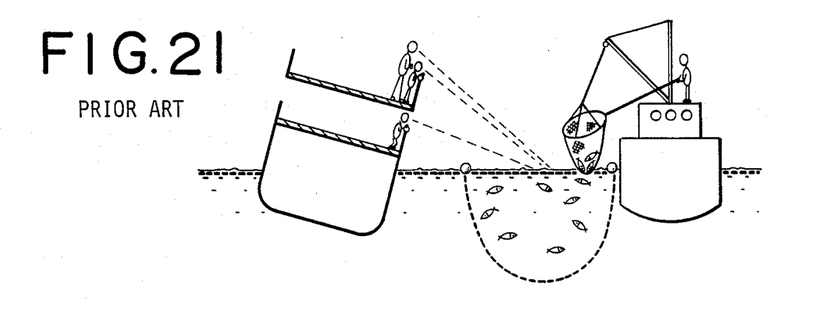
FIG. 21 is a rear view partly in cross section showing the use of a former sightseeing and aquatic exhibition boat.

As shown in FIG. 21, former sightseeing and aquatic exhibition boats for viewing activities such as fish netting operations performed by a fishing vessel, skin diving exhibitions, or synchronized swimming demonstrations, have the drawback that in order to avoid dangerous crowding to one side of the boat, some spectators cannot adequately observe the activity.

2. Summary of the Invention

A practical aquatic show boat for safely showing any type of exhibition, demonstration, or other activity taking place on the water surface, or submerged close to the water surface, to many tourists at resort area oceans and lakes is in demand. The present invention was developed to fulfill this demand.

The primary object of this invention is to provide a multipurpose, twin hull, aquatic show boat wherein an activity area, which is entirely surrounded by the two hulls and a plurality of hull connecting pieces, is formed within the vessel for safely exhibiting aquatic demonstrations while in motion or at rest, to a large number of spectators on observation decks constructed on the hulls.

Another primary object of this invention is to provide a multipurpose aquatic show boat with an inexpensive built in (fresh or salt water) pool and aquatic recreation area.

SUMMARY OF THE INVENTION

In accordance with one preferred embodiment of the present invention, an aquatic show boat is structured such that the perimeter of a single central activity area is surrounded by a plurality of connecting pieces, and by a port and starboard pair of parallely disposed, long narrow hulls joined by the connecting pieces. Observation decks, from which the activity area can be observed, are constructed on the hulls surrounding the activity area.

DETAILED DESCRIPTION OF THE INVENTION

The preferred embodiment of the present invention is described based on illustrations as follows.

Figure 1:
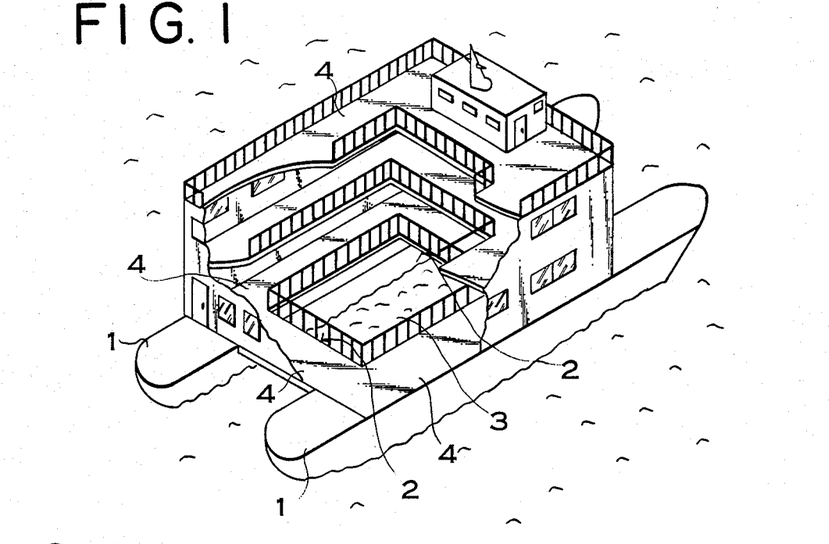
FIG. 1 is an oblique view, partially in cross section, showing an aquatic show boat which constitutes a preferred embodiment of the present invention.
Figure 2:
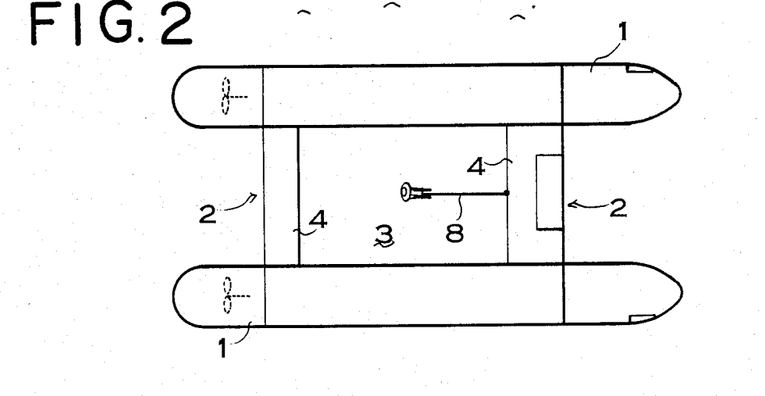
FIG. 2 and FIG. 3 are a plan view and a side view in cross section respectively showing a preferred embodiment of the present invention.
Figure 3:
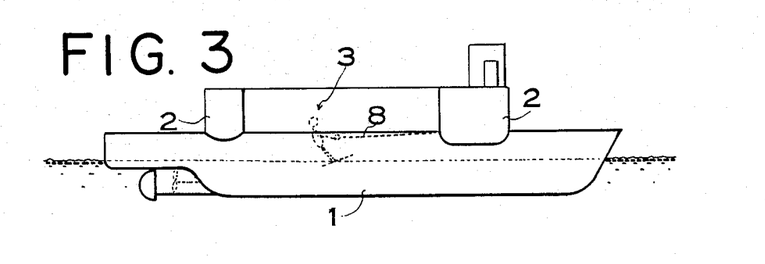

Turning to FIG. 1 through FIG. 3 the multipurpose, twin hull, aquatic show boat illustrated comprises a pair of hulls 1 and connecting pieces 2, which join the hulls 1 together in a manner that forms an activity area 3 enclosed by the hulls 1 and the connecting pieces 2. The hulls 1 are designed long and narrow with a pointed bow to offer little hydrodynamic drag, and are individually equipped with a propulsive means in the stern to allow self propulsion.

Provision of a propulsive means in each hull 1 allows movement of the aquatic show boat without being towed by another vessel. However, since there are both self propelled as well as towed types of aquatic show boats, the present invention does not exclusively specify requirement for a propulsive means, and it is obvious that a non self propelled aquatic show boat can be set afloat, moved by towing and used in a manner consistent the intent of the present invention.

The starboard and port hulls 1 are disposed in a separated and parallel configuration such that an activity area 3 is entirely enclosed by the hulls 1 and the connecting pieces 2. Various aquatic activities and exhibitions can thereby be safely performed in the enclosed activity area 3. The separation between the hulls 1 is determined by considering the type of intended aquatic activity and the total length of the hulls 1. In general this separation is selected within a range from 2 m. to 30 m., and more desirably within a range from 4 m. to 10 m.

As illustrated, the hulls 1 are constructed to project beyond the connecting pieces 2 at the bow and stern, and to have a total length (for example) on the order of 10 m. to 100 m.

Projection of the hulls 1 beyond the connecting pieces 2 at the bow and stern is a feature which greatly improves stability by reducing the vessel's tendency to list or incline when spectators crowd together at one point on the observation deck 4. Since each hull 1 is long and has a large buoyancy, a single hull will sink little even if spectators crowd onto that hull, and the tendency for the vessel to list to the port or starboard side is thereby minimized. Also, although crowding of spectators onto either the fore or aft connecting piece 2 will cause some inclination of the vessel, this inclination is also minimized by projection of the hulls 1 fore and aft beyond the connecting pieces 2.

Figure 4:
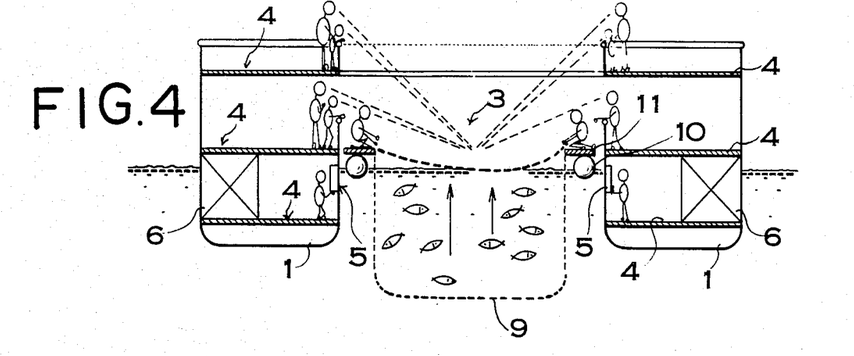
FIG. 4 through FIG. 8 are front, side and oblique views in cross section showing examples of the use of the aquatic show boat of the present invention.

Turning to FIG. 4, each hull 1 is further provided with a ballast tank 6 and a water inlet and outlet means (not illustrated) to allow adjustment of the hull water line level making it possible to view aquatic activities from below as well as above the water surface through the underwater windows 5. The underwater windows 5 are positioned such that they are submerged for water line levels high on the hulls 1, and above water for water line levels low on the hulls 1. The underwater windows 5 are installed in the side of each hull 1 which faces the enclosed activity area 3, and can be formed from transparent plates, such as glass, mounted in a water tight fashion in window openings in the hull 1.

The capacity of the ballast tanks 6 is such that when they are filled with water, the underwater windows 5 submerge entirely below the water line. Water inlet and outlet means (not illustrated) supply and discharge water to each ballast tank 6 via water pumps connected to each tank. Water can be discharged by gravity for ballast tanks 6 that are installed above the hull water line, and for this case discharge can be accomplished without pumping through an opening in the hull 1.

As shown in FIG. 4, to avoid blocking the view of the activity area 3, installation of a ballast tank 6 within the hull 1 is desirable on the side of the hull opposite the activity area 3. This configuration allows adequate viewing along the entire side of the hull 1 facing the activity area 3.

As shown in FIG. 1 and FIG. 4, it is desirable to provide a plurality of observation decks 4 on the hulls 1. A multi-level arrangement of observation decks 4 not only allows many spectators to view activities in the activity area 3, but also offers a choice of various viewing angles.

As shown in FIG. 4, the first above water deck is established somewhat above the water line level when the water line is at its highest attainable level. Higher level decks are established at heights which allow convenient angles to look down at the activity area. The underwater observation deck is established at a level that allows the activity area to be viewed through underwater windows 5 when the hulls are in the submerged state. The hull structure is such that the connecting pieces 2 are above the water level when the hulls 1 are in their most buoyant state.

Figure 5:
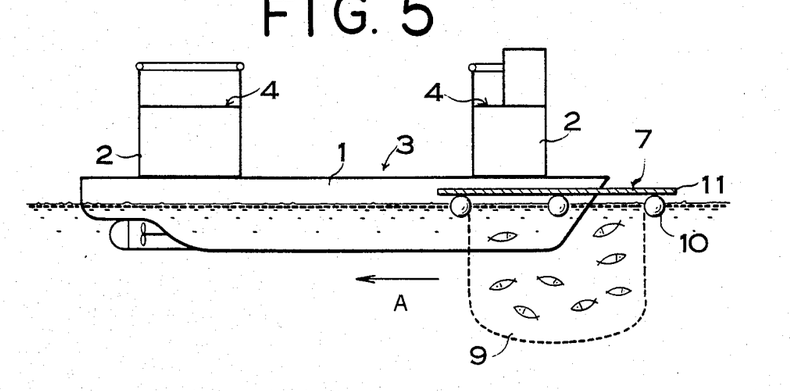
Figure 6:
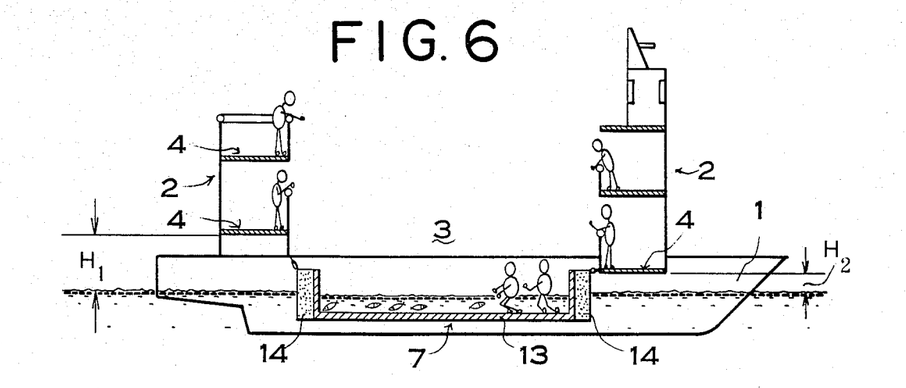

The connecting pieces 2 join the port and starboard hulls 1 in a parallel fashion to form a solid frame. The activity area 3 is thereby formed inside the frame of the vessel. As shown in FIG. 5 and FIG. 6, the connecting pieces 2 are established between the hulls 1 in a manner which allows various barge like floats 7 to be easily guided into the activity area 3 without any special preparation of the float 7. Further, the connecting pieces 2 are installed at a specified height above the water level to minimize hydrodynamic drag created by waves produced when the boat is in motion.

For the case where both the fore and aft connecting pieces 2 are at equal heights above the water level as shown in FIG. 5, floats 7 can be guided simply into the activity area 3 from either the front or the rear of the boat.

As shown in FIG. 6, for cases where floats 7 are guided into the activity area 3 from one direction only, the heights of the fore ($H_2$) and aft ($H_1$) connecting pieces 2 may be different. In other words, a connecting piece configuration with $H_1 > H_2$ is also possible.

Furthermore, the heights of the connecting pieces may be positioned such that they are above the water level when the hulls 1 are in the buoyant state, and below the water level when the hulls 1 are in the submerged state.

As shown in the aquatic show boat of FIG. 1. The connecting pieces 2 join with the observation deck 4 on each hull 1, and the observation decks 4 are structured in a multi-level fashion. The connecting pieces 2 are coplanar with the observation deck 4 on each hull 1 and further, the observation decks 4 extend continuously entirely around the activity area 3 making it convenient for spectators to circulate around the activity area.

Now turning to the aquatic show boat shown in FIG. 2 and FIG. 3, a water skiing exhibition within the activity area 3, which can be observed from the surrounding observation decks 4, is depicted. For this case, the boat is set in motion at a specified speed, the water skier in the activity area 3 is pulled by a rope 8 which is fixed to the center of the bow end connecting piece 2, and spectators can watch from the observation decks 4. Various water skiing stunts executed by the performer within the activity area 3 can be viewed from the observation decks 4.

Further, although it is not illustrated, two separate activity areas 3 can be constructed by a configuration utilizing three connecting pieces 2 joining the hulls 1 at specified intervals. This configuration is suitable to meet demand for a large scale vessel capable of carrying several hundred people.

Figure 7:
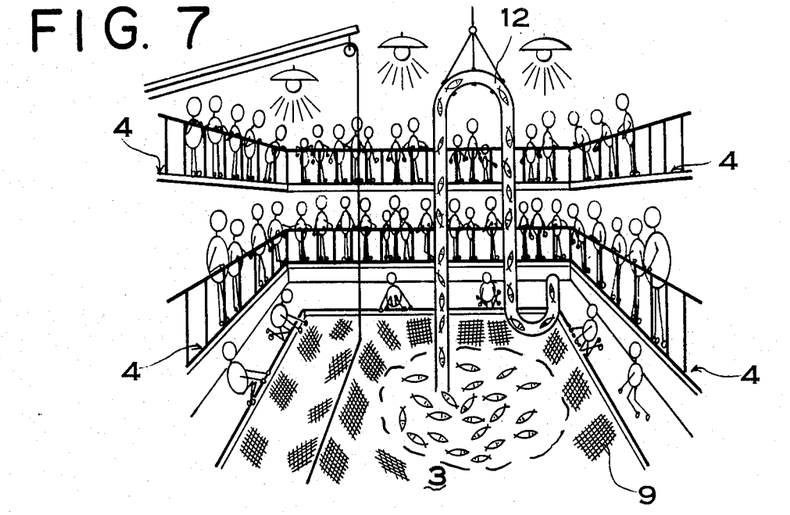

Turning to FIG. 4, FIG. 5 and FIG. 7, a method of demonstrating fish netting operations to sightseers is illustrated. A fish cultivation net 9 (a netted environment established specifically for raising fish) is moved in the direction A relative to the boat shown in FIG. 5 by either moving the boat, or the net, or both. The fish cultivation net 9 is introduced into the enclosed activity area 3 by floating it under a connecting piece 2. As shown in FIG. 4 and FIG. 7, boat movement is ceased for the netting demonstration and water is introduced into the ballast tanks 6 to lower the observation decks 4 closer to the water surface and fix the position of the fish cultivation net 9. After completion of the netting demonstration, water is discharged from the ballast tank 6 to float the vessel and lower the water line, and the fish cultivation net 9 is removed from the activity area 3 and separated from the vessel.

The fish netting demonstration can be observed from the observation deck 4 next to the water surface, from observation deck 4 upper levels which offer a bird's eye view, or from underwater windows 5 which offer a fish's eye view.

The fish cultivation net 9 is equipped with buoys 10 around its perimeter maintaining the open top configuration in which the net is stationed in the ocean or lake. The fish cultivation net 9 is guided under a connecting piece 2 into the activity area 3 in this configuration. As shown in FIG. 4, workers can perform netting operations from either a work deck 11 above buoys 10, or from an observation deck 4.

As depicted in FIG. 7, spectators can get a particularly good view of the netted fish if the fish are pumped from the raised net through transparent tubing 12. Fish and water are sucked into the transparent tubing 12 which is connected to the suction side of a fish pump (a pump which passes fish and water without injuring the fish; not illustrated). The central portion of the transparent tubing 12 is supported by a suspension member which is hoisted aloft, and netted fish are then sucked up the tubing for display.

Now turning to FIG. 6, an example showing a floating pool 13 within the activity area 3 is presented. The floating pool 13 is open at the top, is provided with buoyant pieces 14, and is guided into the activity area 3 in the same manner as the previously described fish cultivation net 9. The floating pool 13 is filled with water and fish so that those on board can get in the pool to play with or try to grab the fish, or watch such activity from the observation decks 4.

Figure 8:
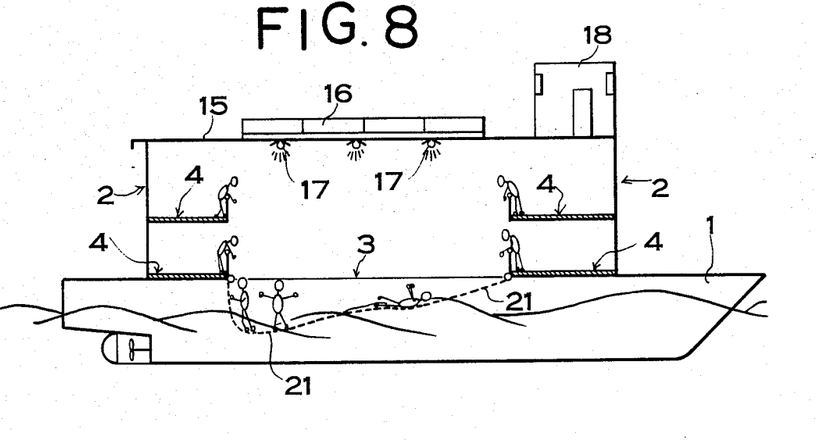

Turning now to FIG. 8, an example of an aquatic show boat with a net 21 installed in the activity area 3 is illustrated. In this case the netted activity area 3 is used for swimming, playing in the waves, chasing fish within the net, etc. and these activities can be observed from the observation decks 4. To permit people within the net 21 to play in safety, the perimeter of the net 21 is attached in a continuous fashion to the hulls 1 and connecting pieces 2 forming the perimeter of the activity area 3. Further, the net 21 has a mesh size which is large enough to pass water but not the human body, and is strong enough to support the body weight of those within the activity area 3 without breaking.

The aquatic show boat with a net 21 installed in the activity area 3 can be set in motion to provide waves and water flow, thereby creating a safe amusement device with an atmosphere unobtainable in land based whirlpool like or water flow swimming pools. Further, observers can also enjoy the fun of watching those playing safely within the activity area 3 from the surrounding observation decks 4.

Since the perimeter of the activity area 3 is completely enclosed regardless of the distance from shore at which the aquatic show boat is operated, very clean water can be enjoyed in the activity area 3 without worrying about drifting away from a vessel far from shore. In addition, the observation decks 4 offer an excellent vantage point from which to oversee those in the activity area 3, or station a lifeguard. The size of the waves and the flow velocity of the water within the activity area 3 can be adjusted by varying the aquatic show boat's speed and region of operation. As long as net 21 is strong enough to ensure that it will not break, a variety of thrilling recreational activities can be enjoyed in complete safety.

A nonporous sheet installed in the activity area 3 in place of the previously described net 21 can be used even in winter for recreational activities without immersion in the water. Wave motion and water flow under the sheet can be utilized to create a new amusement equivalent to "water trampolining" or "waterbed surfing".

The aquatic show boat of this invention may also be utilized for marine life shows involving entertainment animals such as dolphins and grampus whales, etc. which can be observed from the surrounding observation decks 4.

The activity area 3 of the aquatic show boat shown in FIG. 8 is enclosed by a crew deck 15 overhead. The crew deck 15 is provided with a sunlight shutter means 16 such as a sun roof window, etc. which can be opened during daylight hours to illuminate and ventilate the activity area 3. During night excursions, the sunlight shutter means 16 can be closed and illumination can be provided by a lighting system 17. The sunlight shutter means 16 is configured such that light from the lighting system 17 does not leak out to impede night vision in the stern direction from the helm 18. The helm 18 is constructed above the level of the crew deck 15. Further, if the crew deck 15 is constructed in a water tight fashion using waterproof materials, the sunlight shutter means 16 can be closed to prevent the inundation of water within the activity area 3 during rainy weather. Consequently, this configuration offers day, night and all weather use of the activity area 3 in an aquatic show boat which can navigate safely in the dark.

Figure 9:
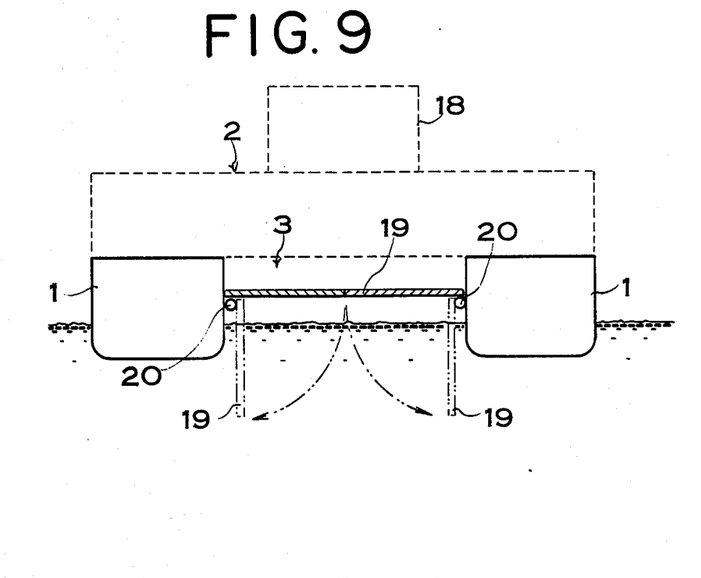
FIG. 9 and FIG. 10 are a front and a fragmentary side view in cross section respectively showing embodiments of the present invention incorporating an activity area deck.
Figure 10:
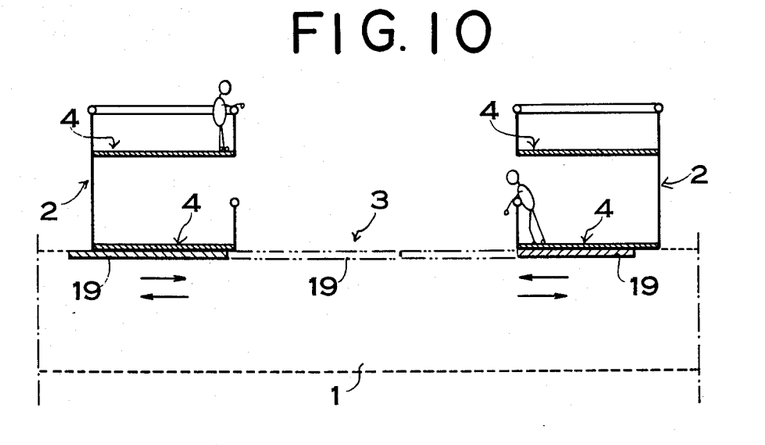

Turning now to FIG. 9 and FIG. 10, further specific examples of the use of the aquatic show boat are illustrated. These drawings each depict the installation of an activity area deck 19 which can be opened or closed above the water of the activity area 3.

The activity area deck 19 shown in FIG. 9 is divided in the middle into two pieces which recline downward from the horizontal position. The two pieces of the activity area deck 19 are mounted to the inboard sides of the hulls 1 through pivot rods 20, and are moved between the horizontal and vertical positions by an actuator means (not illustrated).

During vessel movement, the activity area deck 19 is put in the horizontal, solid line position shown in FIG. 9 to provide space for passengers to gather, or for other purposes. The activity area deck 19 is put out of the way in the vertical dotted line position shown in FIG. 9 when the activity area 3 is used for exhibitions, etc.

FIG. 10 shows an activity area deck 19 which divides into bow and stern end pieces which slide open and closed. The two activity area deck 19 pieces are free to slide into, or out of an area under the bow and stern end connecting pieces 2, and the deck pieces can be stored under those connecting pieces 2. This type of activity area deck 19 can completely cover the activity area 3, or it can partially cover the activity area 3 to provide a multipurpose area for spectators to gather or crew members to work.

Figure 11:
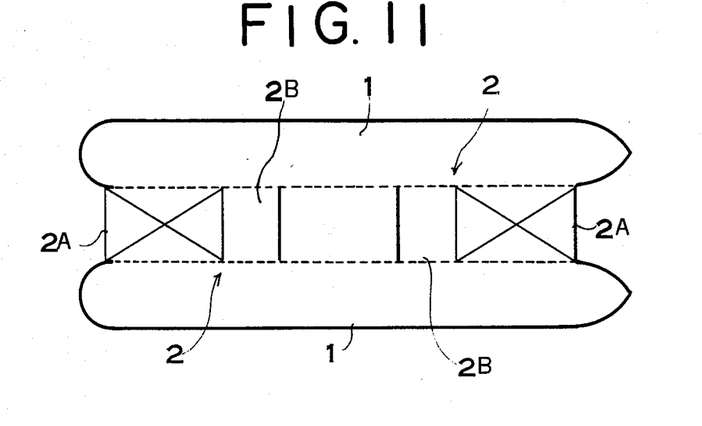
FIG. 11 and FIG. 12 are a plan view and a side view in cross section respectively showing an alternate preferred embodiment of the present invention.
Figure 12:
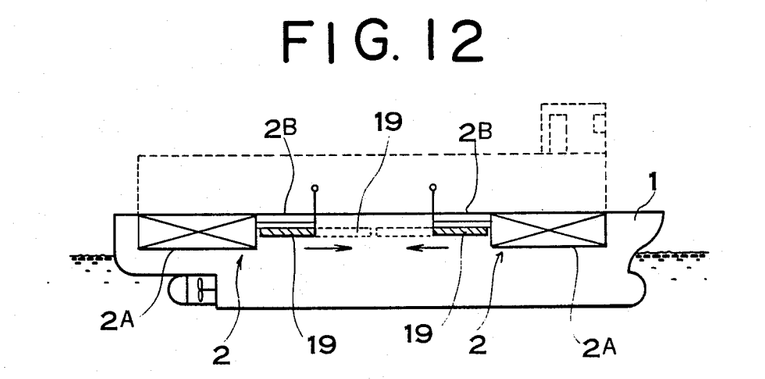

Turning now to FIG. 11 and FIG. 12, an aquatic show boat is shown with reinforced linkage between the two hulls 1 provided by connecting pieces 2 comprising connecting frames 2A and connecting piece decks 2B. Reinforcing frames in the connecting pieces 2 are necessary to withstand externally imposed stress such as that from impact with waves. The connecting frames 2A are reinforcement truss structures provided to meet this need. The connecting piece decks 2B are plank like structures thin in comparison with the connecting frames 2A. The activity area deck pieces 19 are free to slide under the connecting piece decks 2B.

With this configuration, connection between the hulls 1 can be reinforced, and the activity area deck 19 can be positioned close to the upper surfaces of the connecting pieces 2. Consequently, when the activity area deck 19 is closed, it is essentially at the same level as the connecting pieces 2, and when the vessel is in motion, the high position of the activity area deck 19 minimizes hydrodynamic drag caused by wave impact.

Figure 13:
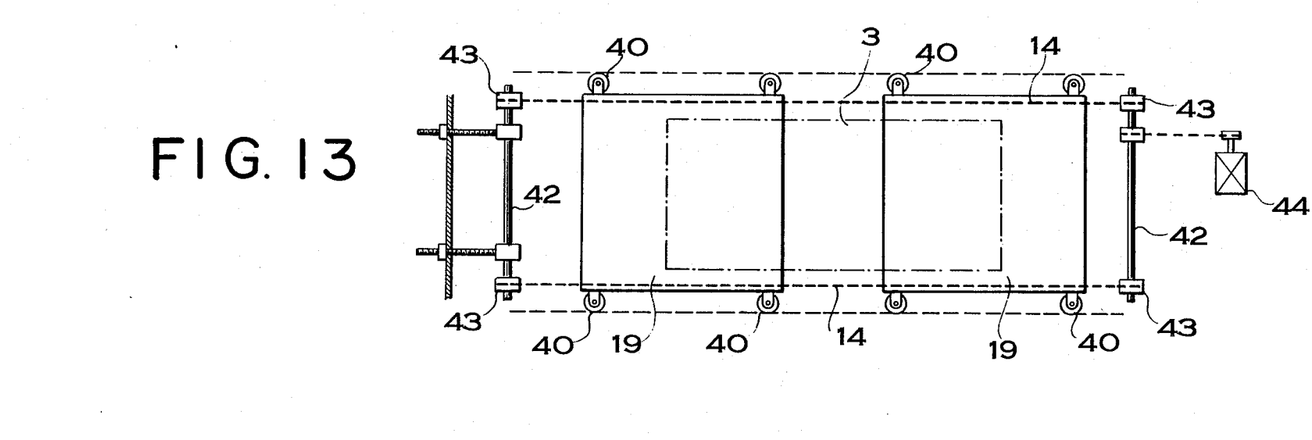
FIG. 13 and FIG. 14 are a plan view and a side view respectively showing the structure of the activity area deck.
Figure 14:
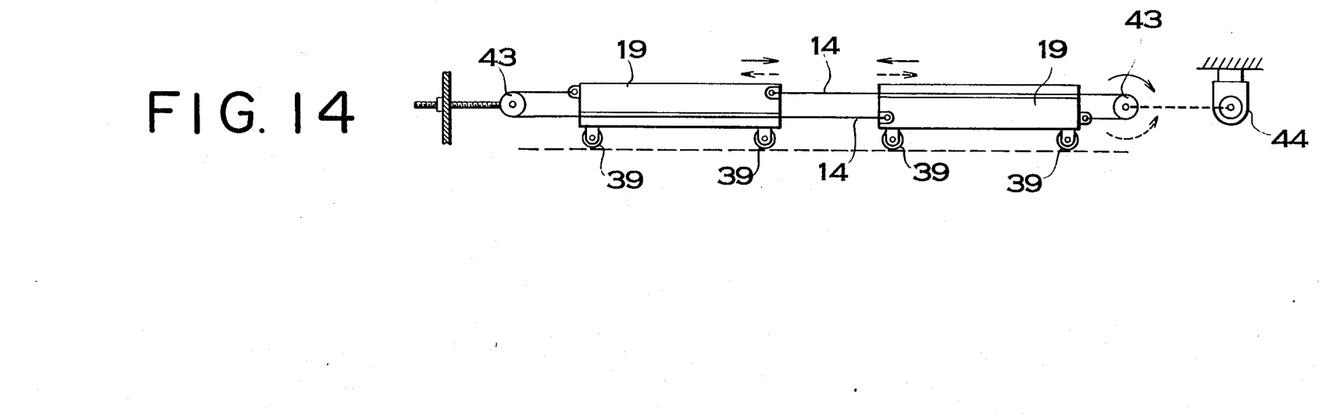

Turning now to FIG. 13 and FIG. 14, a specific example of the structure of an activity area deck 19 which opens and closes over the activity area 3 is illustrated. The activity area deck pieces 19 shown in these diagrams each have four roller wheels mounted beneath each corner for deck movement, and four guide rollers mounted on the outer edge at each corner for tracking. The ends of actuator lines 41, which can be chains, cables, or wires, etc. are connected to each activity area deck piece 19. The actuator lines 41 are engaged with sprockets 43 mounted on shafts 42 horizontally disposed on each side of the activity area 3. One shaft 42 is driven in either direction by an actuator motor 44. The activity area deck 19 is closed by rotating the shaft 42 with the actuator motor 44 in the direction shown by the solid line arrow of FIG. 14, and opened by rotating the shaft 42 in the opposite direction shown by the broken line arrow.

It is also possible to move the activity area deck 19 between the open (solid line position of FIG. 12) and closed (broken line position of FIG. 12) positions by means of a hydraulic system (not illustrated) comprising a hydraulic motor, hydraulic actuator cylinders, etc.

Figure 15:
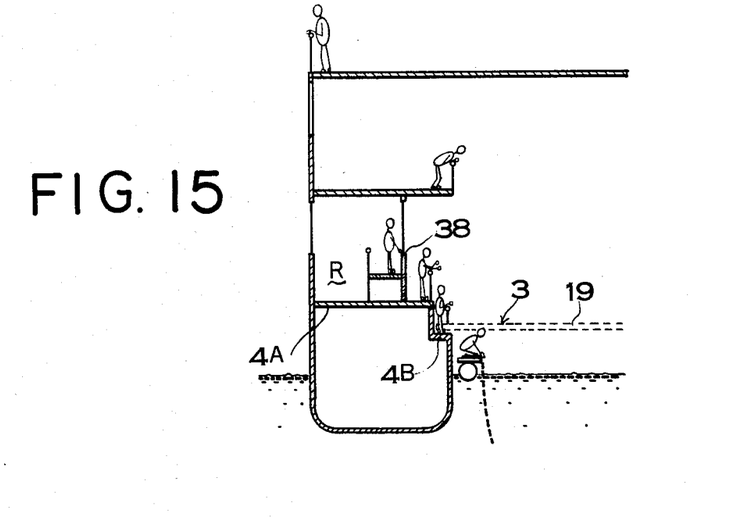
FIG. 15 is a fragmentary rear view in cross section showing an alternate preferred embodiment of the present invention.

Turning now to FIG. 15, an alternate aquatic show boat configuration is depicted. A vertical divider wall 38 is provided along the length of the observation deck 4A. Since the divider wall 38 is impenetrable by water, the introduction of water into a hull 1 is prevented even in the unlikely event of extreme rocking or listing. Specifically, imagining the area to the right of the divider wall 38 (within the activity area 3) in FIG. 15 to be outside the vessel, the divider wall 38 ensures boat safety by preventing water from entering the vessel interior R.

Further, as shown in FIG. 15, the ledge 4B on which the activity area deck 19 slides can be used as an observation deck when the activity area deck is pulled away. Consequently, an aquatic show boat in this configuration provides a series of observation decks at various levels.

Figure 16:
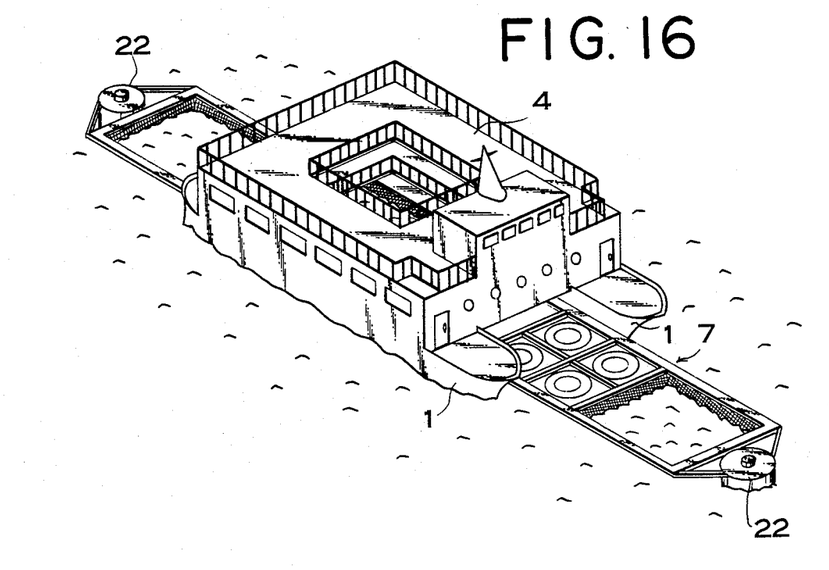
FIG. 16 is an oblique view showing a barge like float in relation to the aquatic show boat which constitutes an alternate preferred embodiment of the present invention.
Figure 17:
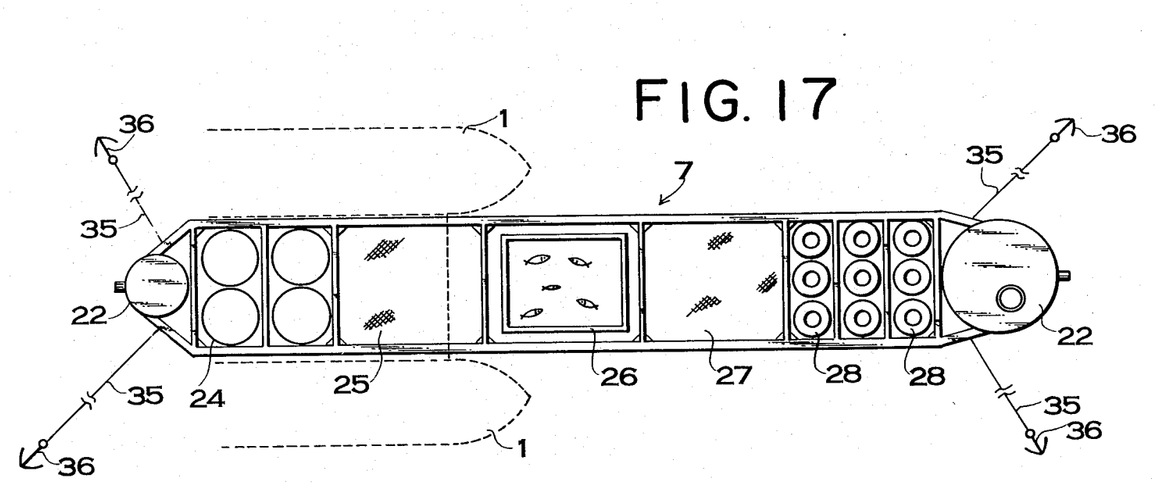
FIG. 17 and FIG. 18 are a plan view and a side view in cross section respectively showing an example of a float.
Figure 18:
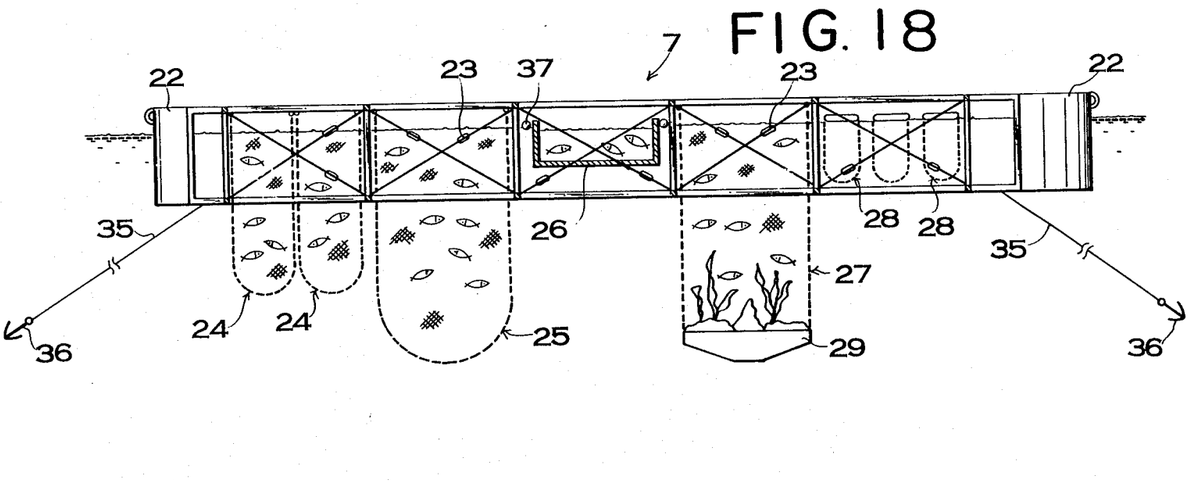
Figure 19:
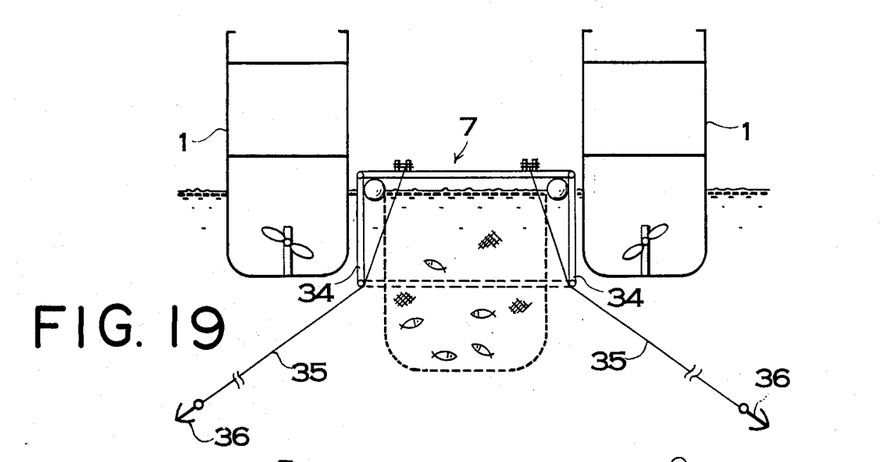
FIG. 19 is a rear view in cross section showing the float of FIG. 17 and FIG. 18 in the moored state.

Turning now to FIG. 16 through FIG. 20, a float 7 which can be used to exhibit various float contents in a serial fashion is illustrated. The float 7 is a long narrow frame made from material such as pipes, and has buoyant tanks 22 affixed at both ends. The frame of the float 7 extends vertically from both sides into the water down to a specified depth, and the structure of the frame is such that the float 7 area on the water surface is divided into a plurality of smaller regions. As shown in FIG. 17, FIG. 18 and FIG. 19, the frame of the float 7 is made rigid by wires, cables, or such joined by fasteners 23, and is made visible from a distance by the buoyant tanks 22 which float part of the frame above the water.

The serial exhibit style float 7 is slightly narrower than the width of the activity area 3. The float 7 is put between the central regions of the hulls 1 to fill the activity area 3, the various divided regions are successively introduced into the activity area 3, and exhibits and recreational activities corresponding to each region are examined or utilized in sequence.

The float 7 shown in FIG. 16, FIG. 17 and FIG. 18 is provided with fish cultivation nets 24, a hoisting net 25, a fish pool 26, a diving net 27 and mini cultivation nets 28 disposed in a linear fashion.

As an example of the use of the float 7, fish raised and/or kept in the cultivation nets 24 are put in the hoisting net 25 ahead of time. The region corresponding to the hoisting net 25 is put in the activity area 3, and fish netting and net hoisting operations are demonstrated. Next, the aquatic show boat is moved forward slightly, the fish pool 26 is put in the activity area 3 and pool activities such as fish chasing are engaged in. The aquatic show boat is again moved slightly forward, the diving net 27 is put in the activity area 27 and diving activities are undertaken. The diving net 27 is such that the human body cannot pass through the net sides or the simulated ocean/lake bottom 29, and skin diving or other diving activities and demonstrations can be performed within the restricted net environment in extreme safety.

Figure 20:
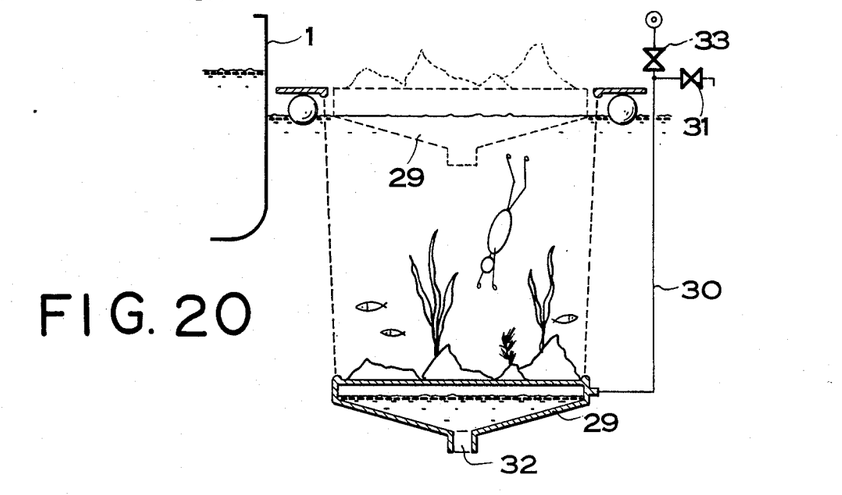
FIG. 20 is a fragmentary rear view in cross section showing a diving net.

The diving net 27 shown in FIG. 20 is a bounded area designed for skin diving. The simulated ocean or lake bottom 29 is a submergible, air tight structure provided with an air inlet/outlet line 30, an outlet valve 31, an inlet valve 33, a compressed air supply (not illustrated) and a water inlet/outlet orifice 32. The simulated bottom 29 is submerged by discharging air through the outlet valve 31 to let water enter through the orifice 32. The simulated bottom 29 is floated to the surface (shown by the dotted line position of FIG. 20) for refurbishing by opening the inlet valve 33 to introduce compressed air from the compressed air supply into the simulated bottom 29, thereby discharging water out the orifice 32. Activity within the diving net 27 can be clearly observed through the underwater windows 5 in the hulls 1.

The serial exhibit style float 7 is designed with a width that essentially extends across the activity area 3, and with anchor lines 35 from the top of the float for mooring. In this configuration, entanglement of an anchor line 35 with a hull propeller is possible during introduction of the float 7 between the hulls 1. For this reason, as shown in FIG. 19, anchor lines 35 from the buoyant tanks 22 are routed downward to extend beneath the vertical sides of the float frame 34 to the anchor 36 at the ocean or lake bottom.

The fish cultivation nets 24, hoisting net 25, fish pool 26, diving net 27 and mini cultivation nets 28 are open at the top and have upper edges connected to the float frame or to buoys.

The fish pool 26 has a box configuration open at the top with buoys 37 provided around the upper edge which is connected with the float frame.

The barge like float 7 can be moved when its anchor 36 is up. The float 7 can be towed by another vessel to a prescribed location or guided into the activity area 3 of the aquatic show boat. However, the float 7 can also be configured as a self propelled vessel such that successive exhibits, etc. can be moved under float 7 power into the activity area 3 of the aquatic show boat. This invention includes both floats 7, which are towed like barges, and floats 7, which are self propelled.

Further, the float 7 shown in FIG. 17 and FIG. 18 is one specific example which is divided into five separate regions or exhibits, etc. Clearly, floats 7 of this invention are not restricted to five regions, and floats with many more separate regions providing a greater variety of exhibits or recreational activities, as well as floats with fewer separate regions, are also possible.

Still further, the types of exhibits or recreational activities provided by a float 7 are not limited to those mentioned above. For example, various interesting fish could be assembled within a netted region to provide a water borne aquarium.

What is claimed is:

1. An aquatic show boat comprising:
   a pair of long, narrow, spaced opposed, parallel port and starboard hulls for floating on a body of water;
   a plurality of connecting pieces interconnecting said pair of hulls, said plurality of connecting pieces and said pair of hulls jointly defining an open activity area, having an upwardly open opening, and said at least one activity area being in fluid communication with the body of water when the show boat is in the body of water;
   at least one observation deck attached to at least one of said plurality of connecting pieces and of said pair of hulls, and said at least one observation deck being adjacent to said opening of said at least one open activity area for providing viewing of said at least one activity area; and
   means attached to said at least one observation deck for varying the size of said opening of said at least one activity area, and said means for varying the size of said opening of said at least one activity area including at least one substantially horizontally slidably attached activity area deck for covering and uncovering said opening.

2. A device as in claim 1, wherein said activity area deck is slidably attached to one of said plurality of connecting pieces for sliding over said opening for providing a deck.

3. A device as in claim 1, wherein said means for varying the size of said opening of said at least one open activity area includes means for movably attaching said at least one observation deck to said one of said plurality of connecting pieces and means for moving said at least one observation deck for varying the size of said opening.

4. A device as in claim 1, wherein the bottom of one connecting piece of said plurality of connecting piece is above the water level at a level different from the bottoms of the other ones of said plurality of connecting pieces when the show boat is in the body of water.

5. An aquatic show boat comprising:
   a pair of long, narrow, spaced opposed, parallel port and starboard hulls for floating on a body of water;
   a plurality of connecting pieces interconnecting said pair of hulls, said plurality of connecting pieces being above the water level, said plurality of connecting pieces and said pair of hulls jointly defining an open activity area, having an upwardly open opening, and said at least one activity area being in fluid communication with the body of water when the show boat is in the body of water;
   at least one observation deck attached to one of said plurality of connecting pieces, and adjacent to said opening of said at least one open activity area for providing viewing of said at least one activity area;
   means attached to said at least one observation deck for varying the size of said opening of said at least one activity area; and
   a net attached to said plurality of connecting pieces and said pair of hulls, extending over substantially said entire activity area, being located in the body of water and below said opening in said activity area for receiving humans thereon from said at least one observation deck when the show boat is in the body of water, having mesh for passing water therethrough and retaining humans, and being sufficiently strong to support a plurality of humans thereon.

6. An aquatic show boat comprising:
   a pair of long, narrow, spaced opposed, parallel port and starboard hulls for floating on a body of water;
   a plurality of connecting pieces interconnecting said pair of hulls, said plurality of connecting pieces being above the water level, said plurality of connecting pieces and said pair of hulls jointly defining an open activity are having an upwardly open opening, and said at least one activity area being in fluid communication with the body of water when the show boat is in the body of water;
   at least one observation deck attached to one of said plurality of connecting pieces, and adjacent to said opening of said at least one open activity area for providing viewing of said at least one activity area; and
   at least one activity float, said activity float being narrower than the width of said activity area for being brought into said activity area between said pair of hulls and below said plurality of connecting pieces when said show boat is in the body of water.

7. A device as in claim 6, wherein said activity float includes a fish cultivation net.

8. A device as in claim 6, wherein said activity float includes a floating pool for holding water and fish therein and for supporting humans thereon.

9. A device as in claim 6, wherein the bottom of one connecting piece of said plurality of connecting pieces is above the water level at a level different from the bottoms of the other ones of said plurality of connecting pieces when the show boat is in the body of water.

* * * * *